United States Patent
Kaiser et al.

(10) Patent No.: US 6,188,717 B1
(45) Date of Patent: Feb. 13, 2001

(54) METHOD OF SIMULTANEOUS RADIO TRANSMISSION OF DIGITAL DATA BETWEEN A PLURALITY OF SUBSCRIBER STATIONS AND A BASE STATION

(75) Inventors: Stefan Kaiser, Munich; Khaled Fazel, Wessling, both of (DE)

(73) Assignee: Deutsche Forschungsanstalt fur Luft-und Raumfahrt E.V., Köln (DE)

( * ) Notice: Under 35 U.S.C. 154(b), the term of this patent shall be extended for 0 days.

(21) Appl. No.: 08/971,583

(22) Filed: Nov. 17, 1997

(30) Foreign Application Priority Data

Nov. 19, 1996 (DE) ................................. 196 47 833

(51) Int. Cl.[7] ............................. H04B 15/00; H04K 1/00; H04L 27/30
(52) U.S. Cl. ............................................. 375/148
(58) Field of Search ..................... 375/200, 130; 370/200

(56) References Cited

U.S. PATENT DOCUMENTS

| | | | |
|---|---|---|---|
| 5,267,266 | * 11/1993 | Chen | 375/232 |
| 5,450,453 | * 9/1995 | Frank | 375/200 |
| 5,463,657 | * 10/1995 | Rice | 375/200 |
| 5,487,069 | * 1/1996 | O'Sullivan | 370/404 |
| 5,504,775 | * 4/1996 | Chouly et al. | 370/210 |
| 5,548,582 | * 8/1996 | Brajal et al. | 370/206 |

FOREIGN PATENT DOCUMENTS 0717505    6/1996 (EP) .

OTHER PUBLICATIONS

Chouly, A; Brajal, A; Jourdan, S; Orthogonal Multicarrier Techniques Applied to Direct Sequence Spread Spectrum CDMA Systems; 1993: IEEE, New York, NY; pp. 1723–1728.*

K. Fazel et al., "On the Performance of Convolutionally–Coded CDMA/OFDM for Mobile Communication System", pp. 468–472.

* cited by examiner

*Primary Examiner*—Stephen Chin
*Assistant Examiner*—Thomas E McKiernan
(74) *Attorney, Agent, or Firm*—Browdy & Neimark

(57) ABSTRACT

The method of the invention is based on an optimum combination of multi-carrier modulation with the spread-spectrum technique. The data of a subscriber station are spread, with the data of a subscriber station being modulated on a set of orthogonal spread sequences and superimposed. The data of a subscriber station are transmitted to a partial quantity of subcarriers in the frequency band, with the partial quantity of sub-carriers associated with the individual subscriber stations being disjunct and distributed over the entire transmission band. A channel estimation required for receiving-side data detection is performed by means of filtering in the time and/or frequency direction of reference symbols. A low-complexity maximum-likelihood sequence estimation is possible for data detection. The method of the invention is well-suited for use for both the upstream and downlinks in future cellular mobile-radio systems.

37 Claims, 12 Drawing Sheets

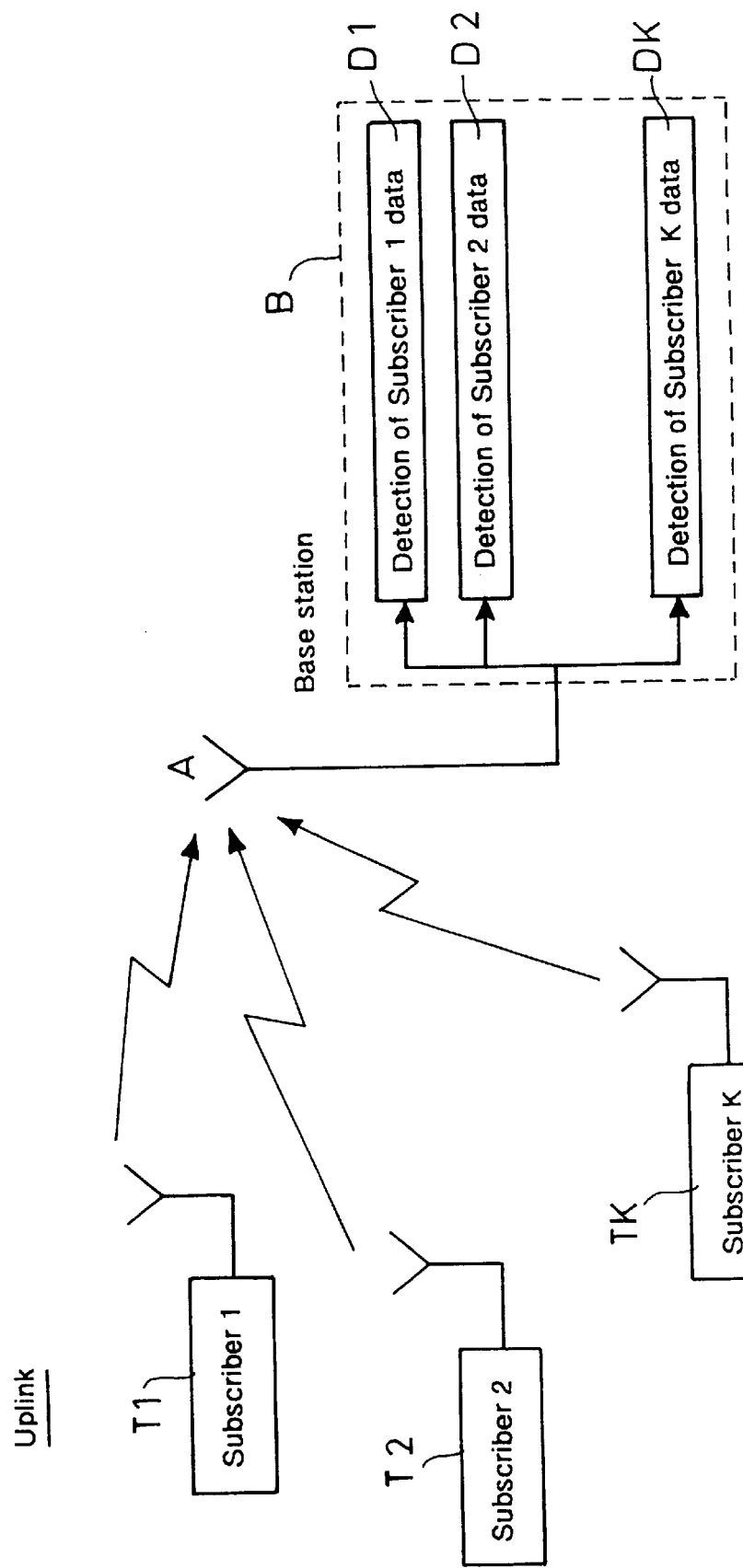

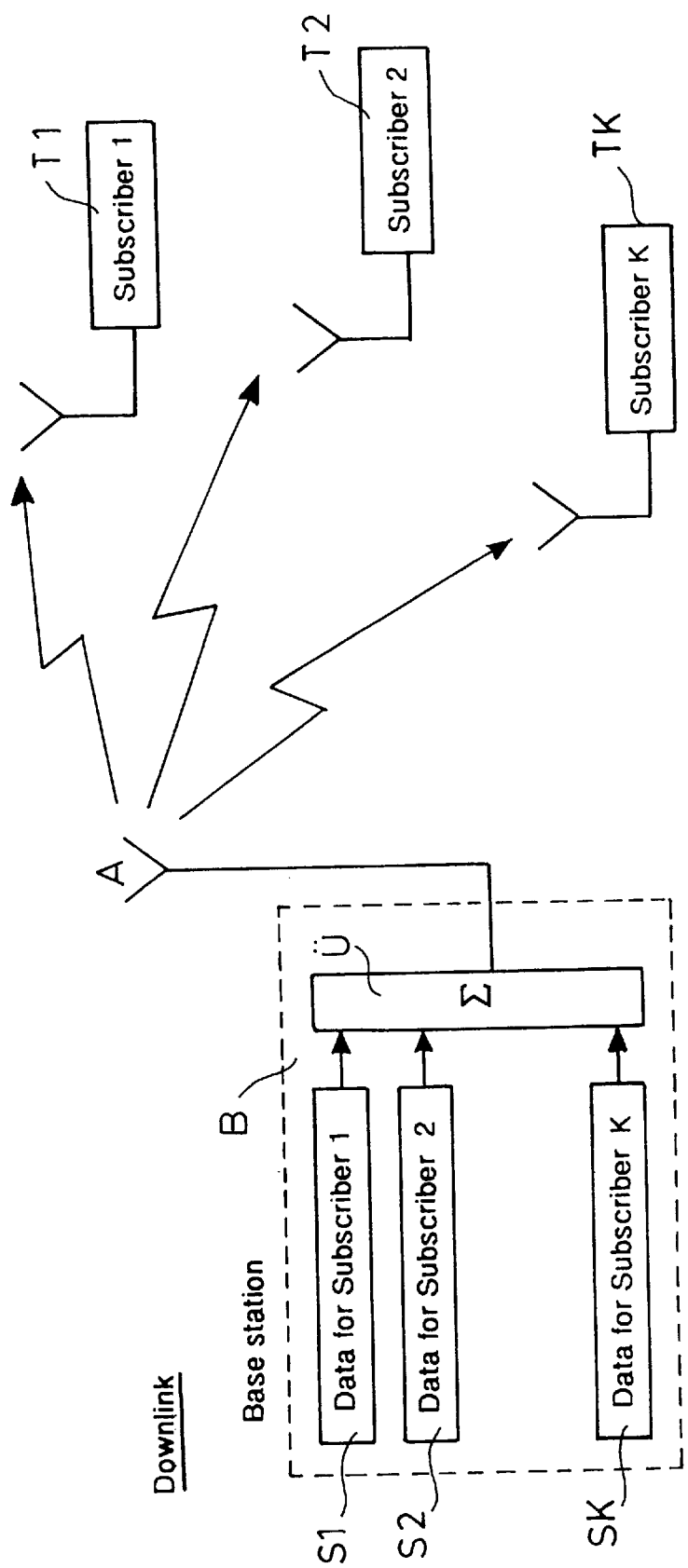

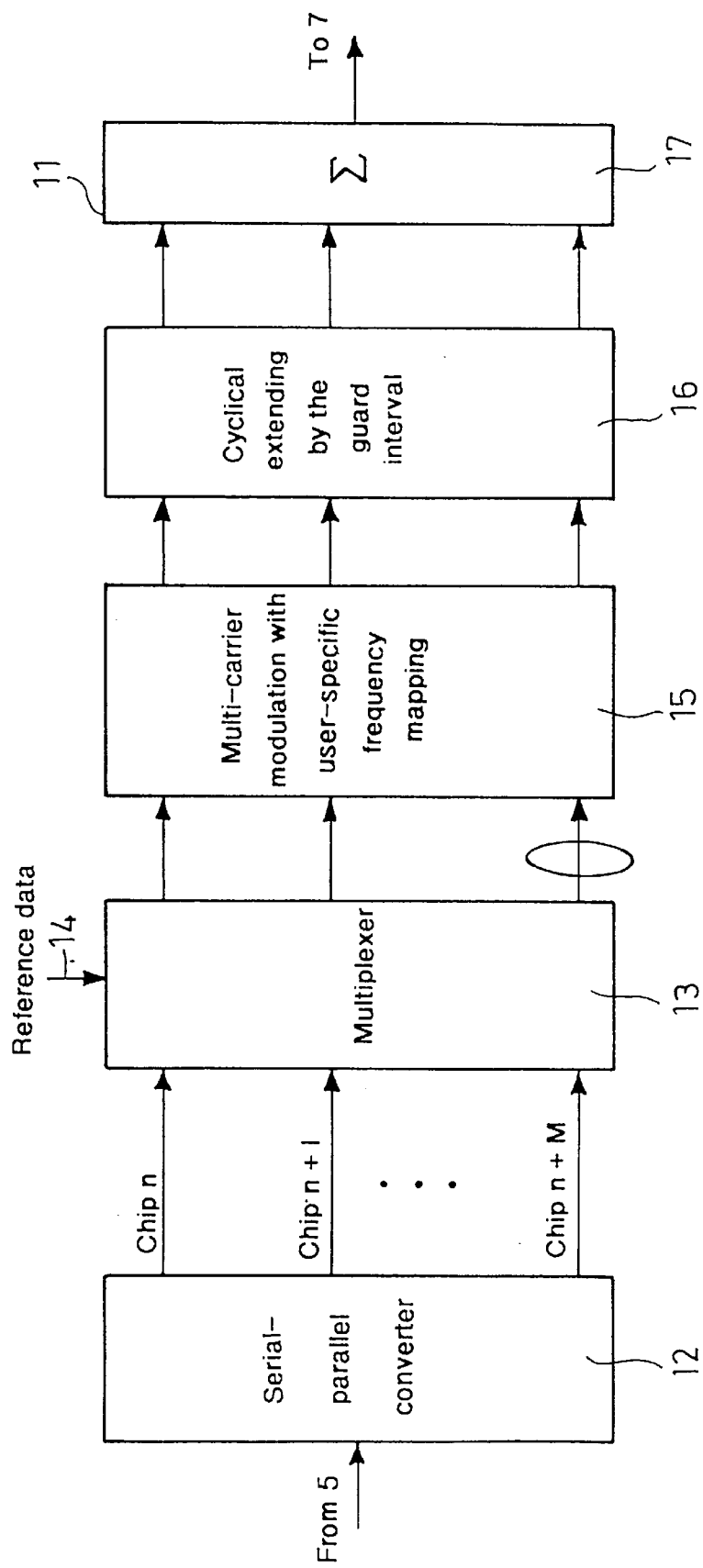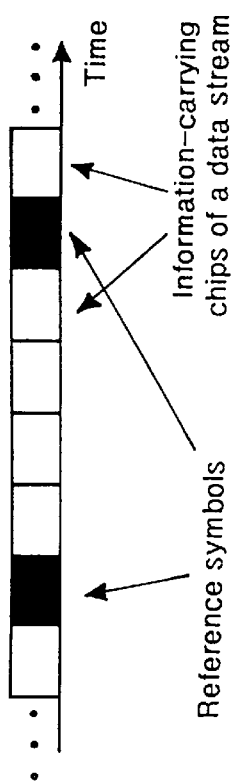
Fig.5

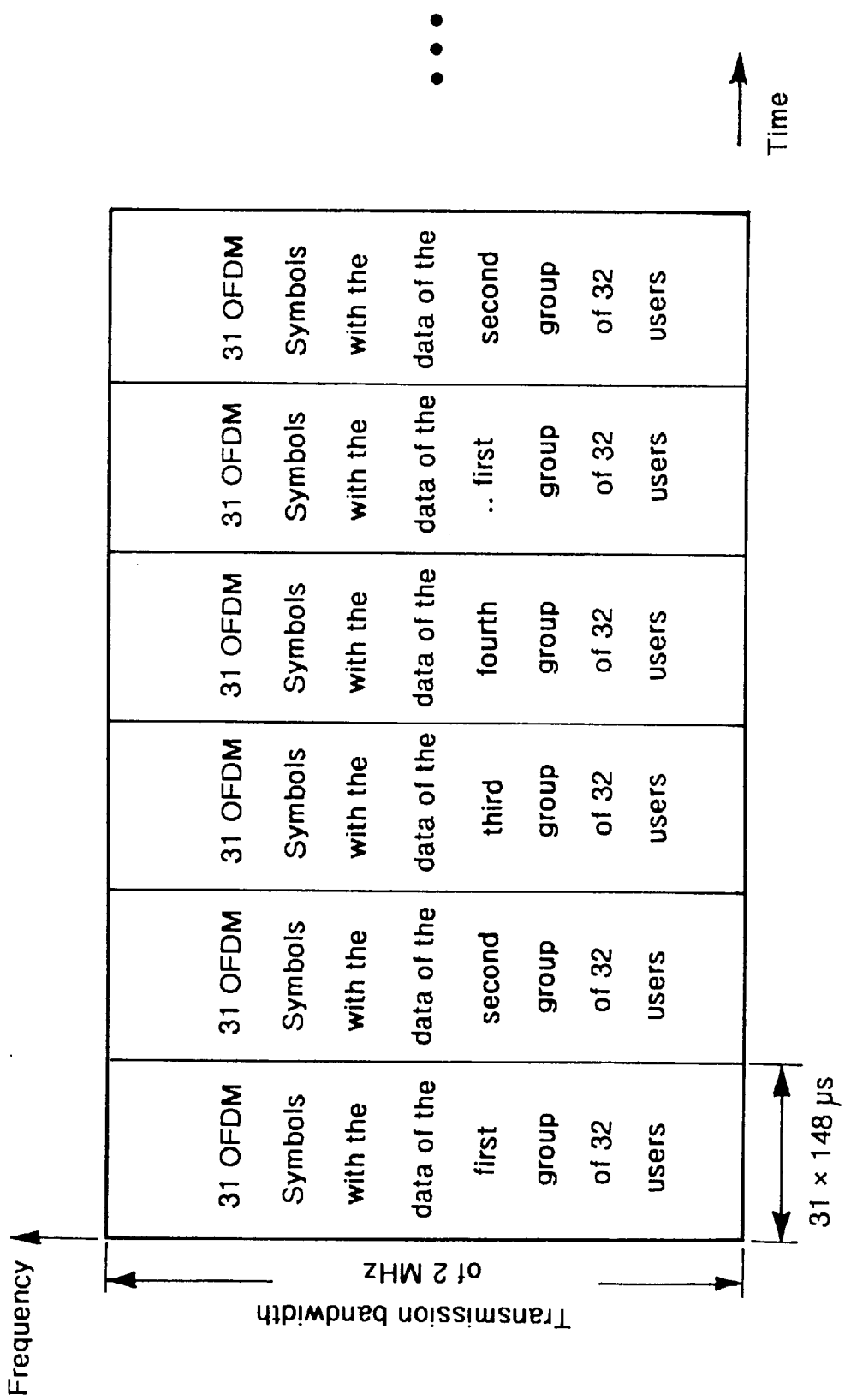

METHOD OF SIMULTANEOUS RADIO TRANSMISSION OF DIGITAL DATA BETWEEN A PLURALITY OF SUBSCRIBER STATIONS AND A BASE STATION

FIELD OF THE INVENTION

The invention relates to a method of simultaneous radio transmission of digital data between a plurality of subscriber stations and a base station.

REVIEW OF THE RELATED TECHNOLOGY

In modern radio-transmission systems, particularly in cellular mobile-radio systems, a transmission method for digital signal transmission is required to be able to supply a large number of active subscriber stations with variable data rates for multimedia services (audio, video, text, data, etc.) must be used for digitally transmitting signals (data). Current and future mobile-radio systems should include mobile subscriber stations that are small, flexible, reliable and robust, and consume little energy to permit long battery operation.

In particular, future cellular mobile-radio systems must be designed to possess a high spectral-efficiency with respect to the transmission method used, despite mobile-radio channel disturbances and the intended high number of subscribers, so a plurality of active subscriber stations can transmit on the available mobile-radio channel. To avoid extreme complexity, and to use identical components, the transmission method should also be applicable for both an uplink, i.e., in the direction from a subscriber station to the base station, and a downlink, i.e., in the direction from a base station to the subscriber station.

The modulation method of future mobile-radio systems should permit a coherent detection with the use of channel-state information, at low cost and with high reliability, and prevent interference (MAI, Multiple Access Interference) between the subscriber stations of a base station.

The detection method of a future cellular mobile-radio system should further permit a low-cost maximum-likelihood sequence estimation (optimum estimation) for common detection of the data of a subscriber station.

The different data streams (audio, video, text, data, etc.) must be transmitted virtually error-free at a variable data rate (a few kbit/s to about 2 Mbit/s) on the available mobile-radio channel.

Different known digital radio-transmission methods already include measures for meeting these requirements, which are expected to be especially required in future cellular mobile-radio systems. The multi-carrier modulation method OFDM (Orthogonal Frequency-Division Multiplexing) with a guard interval can be used as a modulation method having a high spectral efficiency; this method is known from the essay by S. Weinstein and P. M. Ebert, "Data Transmission by Frequency-Division Multiplexing using the Discrete Fourier Transform" in IEEE Trans. Commun. Tech., Vol. COM-19, pp. 628–634, October 1971.

With a given signal-to-noise ratio and the respective channel properties, channel encoding permits the reception of the signal with the desired biterror probability. Moreover, it has been proposed to combine the multi-carrier modulation method OFDM with the CDMA (Code-Division Multiple Access) method (refer to K. Fazel and L. Papke, "On the performance of convolutionally-coded CDMA/OFDM for mobile communication system" in Proc. IEEE Int. Symp. on Personal, Indoor and Mobile Radio Commun. (PIMRC'93), pp. D3.2.1–D3.2.5, September 1993).

It is known that signal-level fluctuations frequently occur during transmission on radio channels, particularly on mobile-radio channels; these fluctuations can be caused by multi-path propagation, temporal change in the channel-transmission behavior and, particularly in mobile radio, by movement of a subscriber station. The time-varying multi-path propagation causes intersymbol interferences (ISI) in the received signal because of different signal arrival times over the individual reflection paths and, consequently, signal fading due to destructive signal superposition. The channel fading has correlations in the time and frequency range. The errors on such channels are therefore frequently bundled and statistically-dependent.

A number of options for eliminating channel disturbances are known. A narrow-band system having equalization can be used. A system of this type with the TDMA (Time-Division Multiple Access) method is already in use in cellular mobile-radio standard GSM (Global System for Mobile Communication). In GSM, the entire transmission bandwidth of 25 MHz is subdivided into 125 channels of 200 kHz. In each 200 kHz-wide channel, the TDMA method is used with GMSK (Gaussian Minimum Shift Keying) modulation. The maximum number of active subscribers per channel is 8 (at a data rate of 13 kbit/s). As a result, each channel has a spectral efficiency of about 0.52 bit/s/Hz.

A second known option for eliminating channel disturbances consists of using a broadband system with spread spectrum and rake receivers based on the CDMA method. This system is included in US Mobile-Radio Standard IS-95, in which all subscriber stations of a cell use the entire channel bandwidth of 1.25 MHz. Each subscriber station has its own code. QPSK (Quadrature Phase Shift Keying) and offset QPSK are used as modulation method. The maximum number of active subscriber stations in a cell, that is, in the region of a base station, is less than 60 (at a data rate of 9.6 kbit/s). Consequently, each channel as a spectral efficiency of less than 0.46 bit/s/Hz.

A third known option for eliminating channel disturbances consists of using a broadband system with Orthogonal Frequency-Division Multiplexing (OFDM). A system this type, having a guard interval, has already been selected for digital audio and terrestrial video broadcasting standards DAB (Digital Audio Broadcasting) and DVB-T (Digital Video Broadcasting Terrestrial)in Europe. The DQPSK (Differentially-Encoded Quadrature Phase Shift Keying) modulation method with robust channel encoding is used in DAB. The spectral efficiency in DAB is about 0.75 bit/s/Hz per channel. In DVB-T, a multi-resolution QAM (Quadrature Amplitude Modulation). is used, with which a flexible selection of up to a 64-QAM constellation can be made. A spectral efficiency of up to 4.5 bit/s/Hz per channel results.

A fourth known option for eliminating channel interference lies in the combination of the broadband spread-spectrum system with the OFDM and COMA methods, as mentioned in the literature references. The spectral efficiency of this method, with BPSK (Binary Phase Shift Keying) modulation, is about half the spectral efficiency of DAB. With QPSK the same spectral efficiency as in DAB can be obtained.

Of the four aforementioned options for eliminating channel disturbances, the narrow-band system with equalization (GSM) and the broadband system with spread spectrum and rake receivers (IS-95) having the drawback of requiring an extremely complex estimation of the channel-state information in the case of coherent detection. To reduce costs, coherent estimation was only used for the downlink in IS-95. For the uplink, a higher transmission power must be used. The spectral efficiency of these two systems is fairly low, namely 0.52 bit/s/Hz and lower.

The advantage of combining the broadband spread-spectrum system with multi-carrier modulation having a guard interval is that no intersymbol interference (ISI) equalization and no rake receiver are required, and the embodiment is relatively simple. The known spread-spectrum multiple-access systems employing the OFDM multi-carrier modulation method and a guard interval are nevertheless only designed for the downlink of a cellular mobile-radio system, because the channel estimation is not problematic in this case.

At this time there is no known method or apparatus that allows the use of synchronous spread-spectrum multiple-access systems having multi-carrier modulation and a guard interval in the uplink with coherent detection, because it is very difficult to estimate the channel-state information of the different transmission channels of all active mobile subscribers simultaneously in the base station.

SUMMARY OF THE INVENTION

Accordingly, the present invention has an object, among others, to overcome deficiencies in the prior art such as noted above.

It is an object of the invention to provide a digital radio-transmission method (or apparatus) that can be used for both the uplink and the downlink, particularly for cellular mobile radio, the method has a high spectral efficiency so that a very large number of active subscriber stations can transmit on the available radio channel; where its modulation method permits a coherent detection with a low complexity and high reliability; that prevents interference between the subscriber stations of a base station; and that ensures virtually error-free transmission of different data streams (audio, video, text, data, etc.) on the available radio channel. In addition, the transmission method is intended to permit at the receiving-side a detection method based on maximum-likelihood sequence estimation (optimum estimation) for common detection of the data of a subscriber station at low cost.

Toward this object the method of the invention optimally combines the multi-carrier modulation method with the spread-spectrum technique. This combination permits a maximum-likelihood sequence estimation with low complexity for coherent detection of the data in the receiver, and can be used for both the upstream and downlinks. The necessary channel estimation can be realized suitably with a simple Wiener filter.

The parameters for the physical layer (modulation, channel encoding, access method, etc.) of a system operating in accordance with the method of the invention can be advantageously selected such that significantly more data can be transmitted per transmission channel than are necessary for pure voice transmission. In the case of voice transmission (9.6 kbit/s), the TDMA (Time-Division Multiple Access) method can be used per transmission channel to accommodate a plurality of voice channels in the transmission channel.

BRIEF DESCRIPTION OF THE DRAWING

The above and other objects and the nature and advantages of the present invention will become more apparent from the following detailed description of the method of the invention and its essential advantages which are explained in detail below by way of an embodiment for a cellular mobile-radio system taken in conjunction with drawings, wherein:

FIG. 1a is a schematic view of a transmission scenario for an uplink in a cell of a mobile-radio system;

FIG. 1b is a schematic view of a transmission scenario for a downlink in a cell of a mobile-radio system;

FIG. 5 is a block diagram of a transmission-side multi-carrier modulation with frequency mapping, including the insertion of reference symbols that serve for channel estimation;

FIG. 10 is a tabular view of the principle of DMA in the application example of FIGS. 9a and 9b.

DETAILED DESCRIPTION OF THE PREFERRED EMBODIMENT

A cellular network according to the OSI (Open-system Interconnection) reference model comprises a plurality of levels or layers: firstly, the network administrator, secondly, the protocol layer (or level), and thirdly, the physical layer (or level). The protocol level is made up of different synchronisation levels such as multiple-access synchronisation and frame synchronisation.

The aforementioned GSM and IS-95 systems contain synchronisation channels which are specified for them. Only the physical level (modulation, channel encoding, access method, etc.) is discussed here in connection with the invention; the present discussion assumes that the synchronisation and network administrator are present.

FIG. 1a illustrates a transmission scenario for an uplink from a mobile subscriber station T1, T2, . . . , TK, respectively, to a base station B. while FIG. 1b shows a transmission scenario for the downlink from the base station B to one of the mobile subscriber stations T1, T2, . . . , TK, respectively.

In the case of the uplink (FIG. 1a), the data transmitted by the subscriber stations T1, T2, . . . , TK via antennas are received in the base station B by an antenna A, then detected, subscriber-specifically, by detection devices D1, D2, . . . , DK. In the case of the downlink (FIG. 1b), the subscriber-specific data originating from the signal transmitters S1, S2 , . . . , SK are collected by a superimposing device U in the base station B. and transmitted from there via the antenna A and received by the subscriber stations T1, T2 , . . . , TK and evaluated there for each individual subscriber.

Because the transmission method of the invention avoids interferences between the signals of the different subscriber stations of a base station, it can be used for both the upstream and downlinks of a cellular mobile-radio network. The following description of the radio-transmission method of the invention therefore applies to both the upstream and downlinks.

Figure 2:
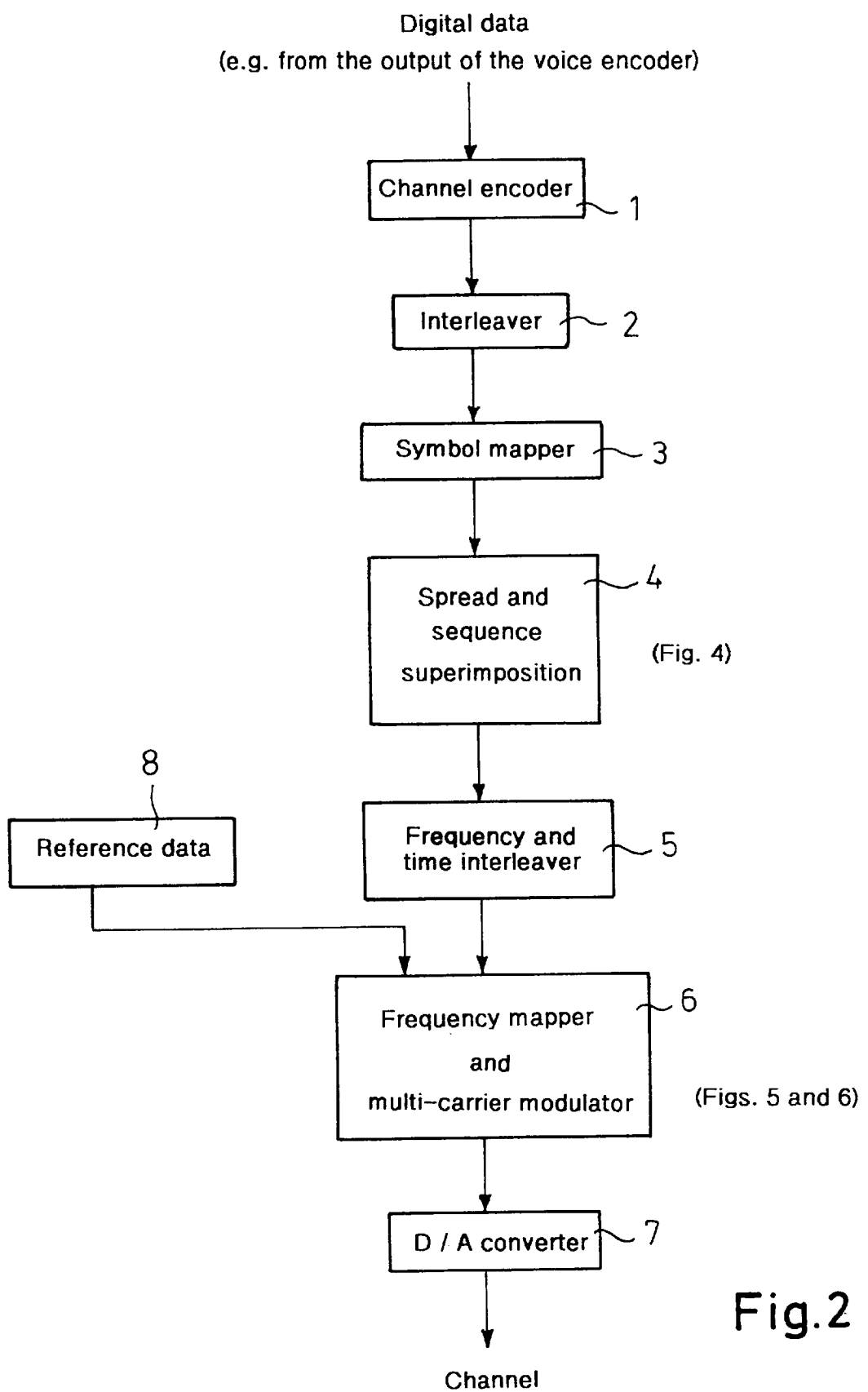
FIG. 2 is a block diagram of a transmission side for the transmission of the data of a subscriber station.
Figure 3:
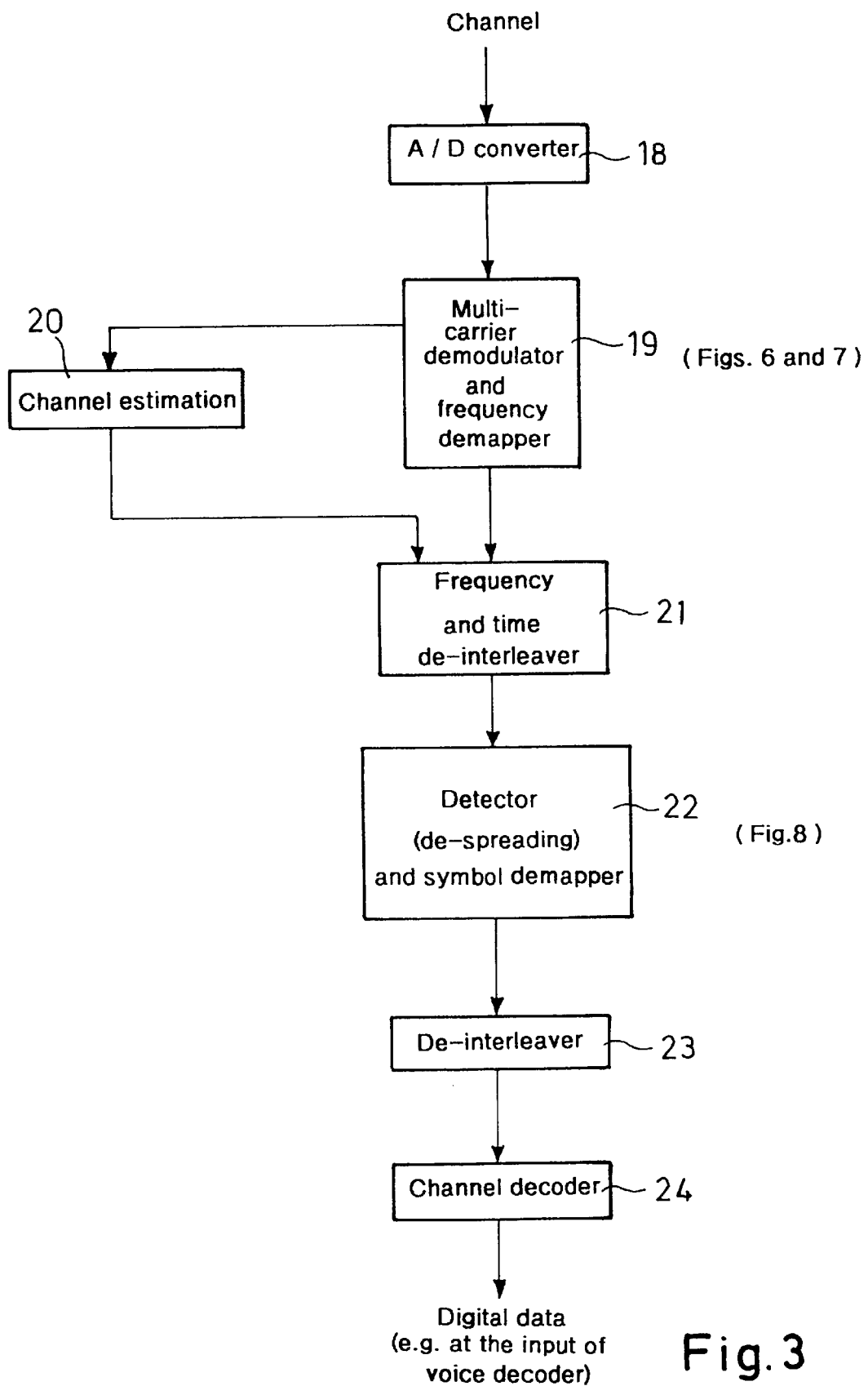
FIG. 3 is a block diagram of a receiving side for receiving the data of a subscriber station.

The transmission path of the multiple-access method according to the invention, employing the spread-spectrum technique and multi-carrier modulation, is illustrated in FIGS. 2 and 3 for the transmission of the data of a subscriber station. FIG. 2 shows a block diagram of the transmission side, and FIG. 3 shows a block diagram of the receiving side.

As shown in FIG. 2, on the transmission side, a channel encoder 1 provides the digital data coming from, for example, the output of a voice encoder with error protection against channel disturbances. Convolution codes, turbo codes or block codes, for example, can be used as channel codes. The code bits are scrambled in blocks or pseudo-randomly, for example, with an interleaver 2 to avoid long error bursts at the input of the channel decoder in the receiver, which will be described later. The scrambled code bits are mapped into complex data symbols in a data-symbol mapper 3, for example with a BPSK (Binary Phase Shift Keying) or a QPSK (Quadrature Phase Shift Keying).

Figure 4:
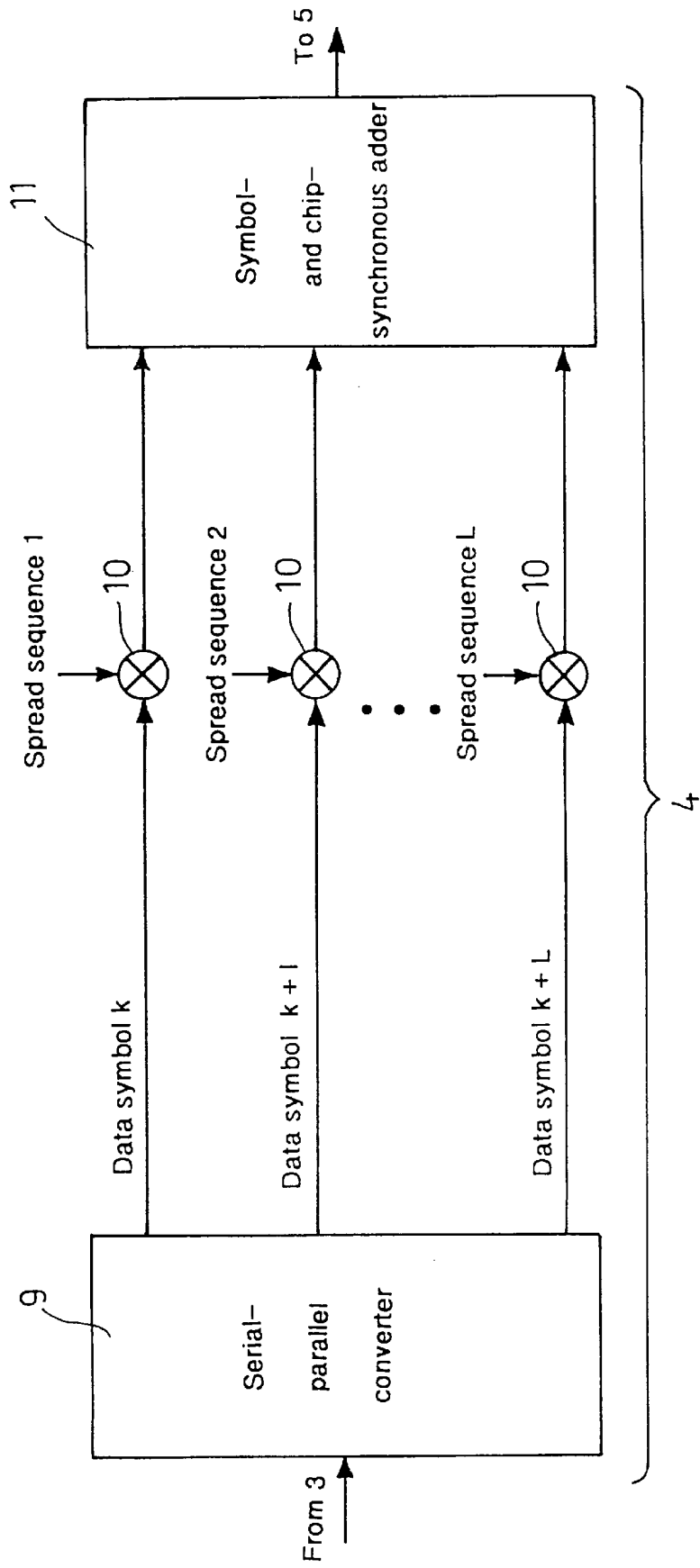
FIG. 4 is a block diagram of a transmission-side spreading of the data symbols and subsequent superimposing of sequences.

Each complex data symbol is then multiplied by a spread sequence of length L (L chips) in an assembly 4 shown in detail in FIG. 4. One chip is one element of the spread-sequence. As FIG. 4 shows, first the complex data symbols coming serially from the data-symbol mapper 3 are converted in blocks into a parallel form in a serial/parallel converter 9. Then, the data symbols k, k+1, . . . , k+L are multiplied by the spread sequences of length L in the multipliers 10.

Orthogonal Walsh-Hadamard sequences, for example, are used as spread sequences; of these, L orthogonal spread sequences of length L exist. A maximum of L parallel spread sequences modulated with data symbols is superimposed, symbol- and thus chip-synchronously, in the assembly 4 (FIG. 2) by means of an adder 11 shown in FIG. 4, resulting in a transmission sequence comprising L chips containing the information of a maximum of L data symbols.

The robustness of the transmission method of the invention with respect to intercell interferences can be increased if less than L spread sequences having length L and having been modulated with data symbols are superimposed. In FIG. 4 the case is shown, where L spread sequences having length L and having been modulated with ata symbols are superimposed.

A frequency and time interleaver 5 then crambles the chips of a plurality of transmission equences coming from the assembly 4, in blocks or pseudo-randomly, for example, in the frequency and time direction using a plurality of multi-carrier-modulated OFDM symbols in order to avoid large error bursts through timeselective fading (which results from Doppler shifts) and frequency-selective fading (which results from reflections in the channel).

In a downstream frequency mapper and multi-carrier modulator 6, whose principle is shown in detail in FIG. 5, M chips coming from the output of the interleaver 5 are converted serial/parallel in a serial/parallel converter 12. It is not absolutely necessary for the number M of sub-carriers of a subscriber station to be a multiple of the spread-code length L, which permits flexible utilisation of the transmission capacity with respect to different data rates, for example variable data rates, of the individual subscriber stations. Reference data 14, which are required for channel estimation and synchronisation in the receiver, are inserted into each of the M data streams by means of a multiplexer 13.

The lower portion of FIG. 5 shows an exemplary data stream, with the information-carrying chips being shown as white boxes and the inserted reference symbols being shown as black boxes. The reference symbols serving for channel estimation are known in the receiver. After the multiplexer 13, each of the M data streams now provided with reference symbols is modulated on its own sub-carrier frequency in a multi-carrier modulator 15, with the frequency allocation being subscriber station-specific.

Figure 6:
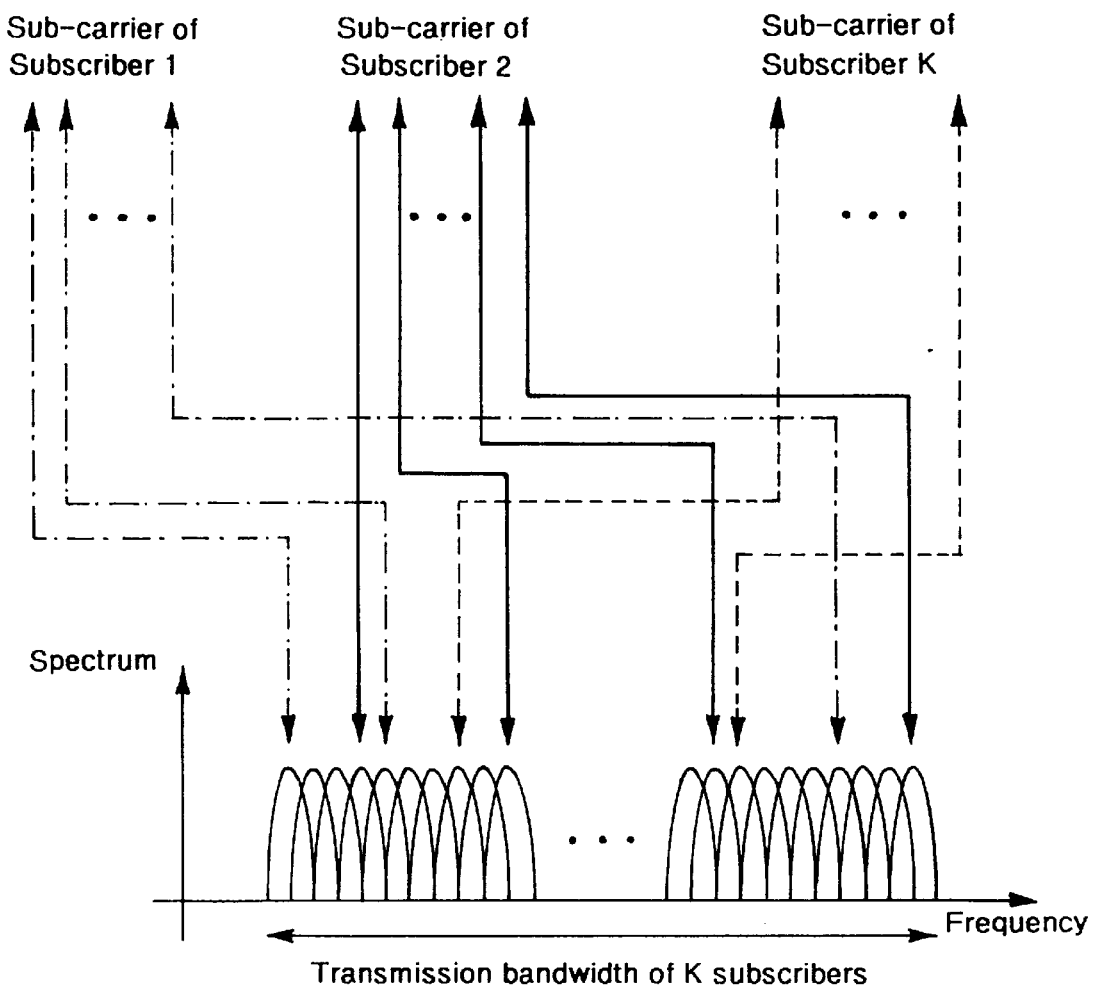
FIG. 6 is a spectral schematic view over the width of the transmission band for K subscriber stations to explain a transmission-side frequency mapping and the corresponding frequency demapping on the receiver side.

FIG. 6 shows the transmission-side subscriber station-specific frequency mapping, and the corresponding, receiving-side frequency demapping, in a spectral view over the width of the transmission-frequency band for K subscriber stations. The partial quantities of sub-carriers associated with the individual subscriber stations are disjunct (or, disjoint), which avoids interferences between the subscriber stations of a base station.

The frequency mapper distributes the subcarriers of a subscriber station over the entire transmission-frequency band for increasing the diversity gain through spreading in the receiver; the spacing between adjacent sub-carriers of a subscriber station remains equidistant, but can also be selected pseudo randomly. The spacing between adjacent sub-carriers of a subscriber station must be a multiple factor of the reciprocal value of the duration of a multi-carrier-modulated symbol to ensure the orthogonality between the sub-carriers of a subscriber station and that of all subscriber stations.

The orthogonal frequency-division method OFDM can be used, for example, which is relatively simple to realize in practice with an Inverse Fast Fourier Transformation IFFT and a Fast Fourier Transformation FFT for the modulation and demodulation performed in the multi-carrier modulator 15. In a device 16, the multi-carriermodulated data symbols are cyclically extended by a guard interval ~ for avoiding intersymbol interferences (ISI) between adjacent multi-carriermodulated OFDM symbols due to multi-path propagation. The M modulated data streams are then added in a summation device 17. Prior to transmission on the transmission channel, the respectively added digital data streams are converted into an analog transmission form in a digital/analog converter 7.

The aforementioned protection interval ~ is additionally necessary for allowing greater tolerances in synchronous transmission of the subscriber stations, because the mobile subscriber stations are at different distances from the associated base station, and therefore have different signal arrival times to and from the base station.

Figure 7:
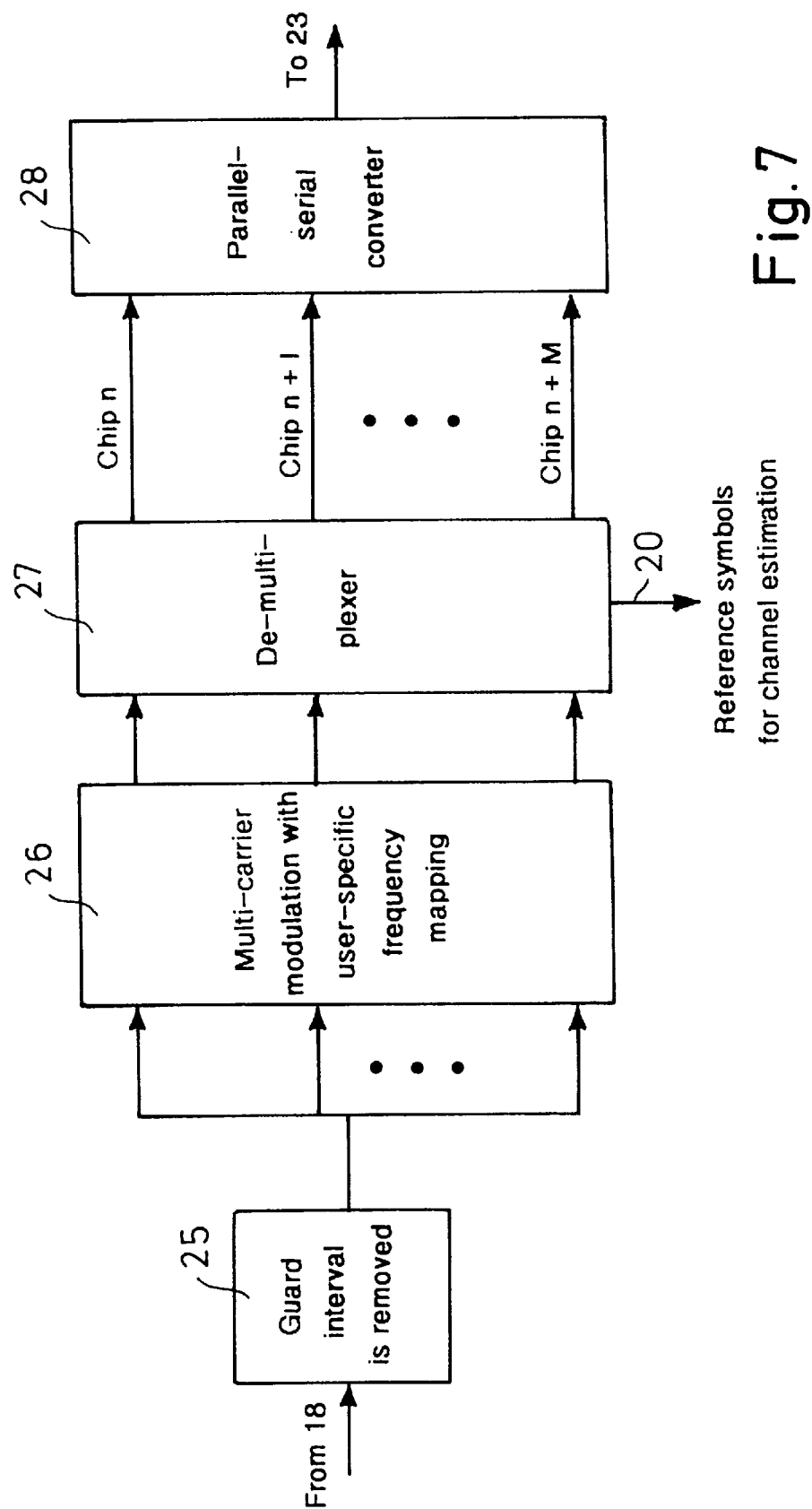
FIG. 7 is a block diagram of a receiving-side multi-carrier demodulation with frequency demapping, including detection of the received reference symbols for the channel estimation.

As shown in FIG. 3, on the receiving side the received data are multi-carrier-demodulated and frequency-demapped in a multi-carrier demodulator 19 following their conversion into digital form in an analog/digital converter 18. The functions of the multi-carrier demodulator 19 are shown in detail in FIG. 7. The data coming from the analog/digital converter 18 are first extracted from the guard interval $\alpha$ in a guard interval-extraction device, and then multiple-carrier-demodulated in a multi-carrier demodulation device 26 and frequency-demapped specifically to the subscriber station.

The receiving-side frequency demapping is effected analogously to the transmission-side frequency mapping; details about the process can be inferred from the description of FIG. 6. The reference symbols needed for channel estimation in the channel estimator 20 (FIG. 3, are extracted from the information-carrying data in a demultiplexer 27. The information-carrying data, which are present in parallel form, are brought into a serial form by means of a parallel/serial converter 28.

The channel estimator 20 shown as a block in FIG. 3 uses, for example, a Wiener filter, which is relatively simple, to filter the received reference symbols for each sub-carrier to be detected over time. From this, it determines the channel-state information for the information-carrying data. In connection with the channel estimation, it is pointed out here that groups (or one group) of sub-carriers can be formed in the transmitter, in which instance the sub-carriers of a group are adjacent in the transmission-frequency band, and can additionally be filtered in the frequency direction in the receiver during channel estimation, resulting in more precise channel-state information or less redundancy through reference symbols. The channel-state information itself that is obtained through the channel estimation is required for receiving-side data detection and channel decoding.

After deinterleaving in the frequency and time direction in a frequency and time de-interleaver 21, the received information-carrying data are detected in a data detector 22. For data detection, a maximum-likelihood sequence estimator is advantageously used, for example, that determines the most probable of all transmitted sequences and provides the associated data as soft decisions. In the use of QPSK-modulated data symbols, for example, the maximum-likelihood sequence estimation can be performed separately in the I and Q signal components.

Figure 8:
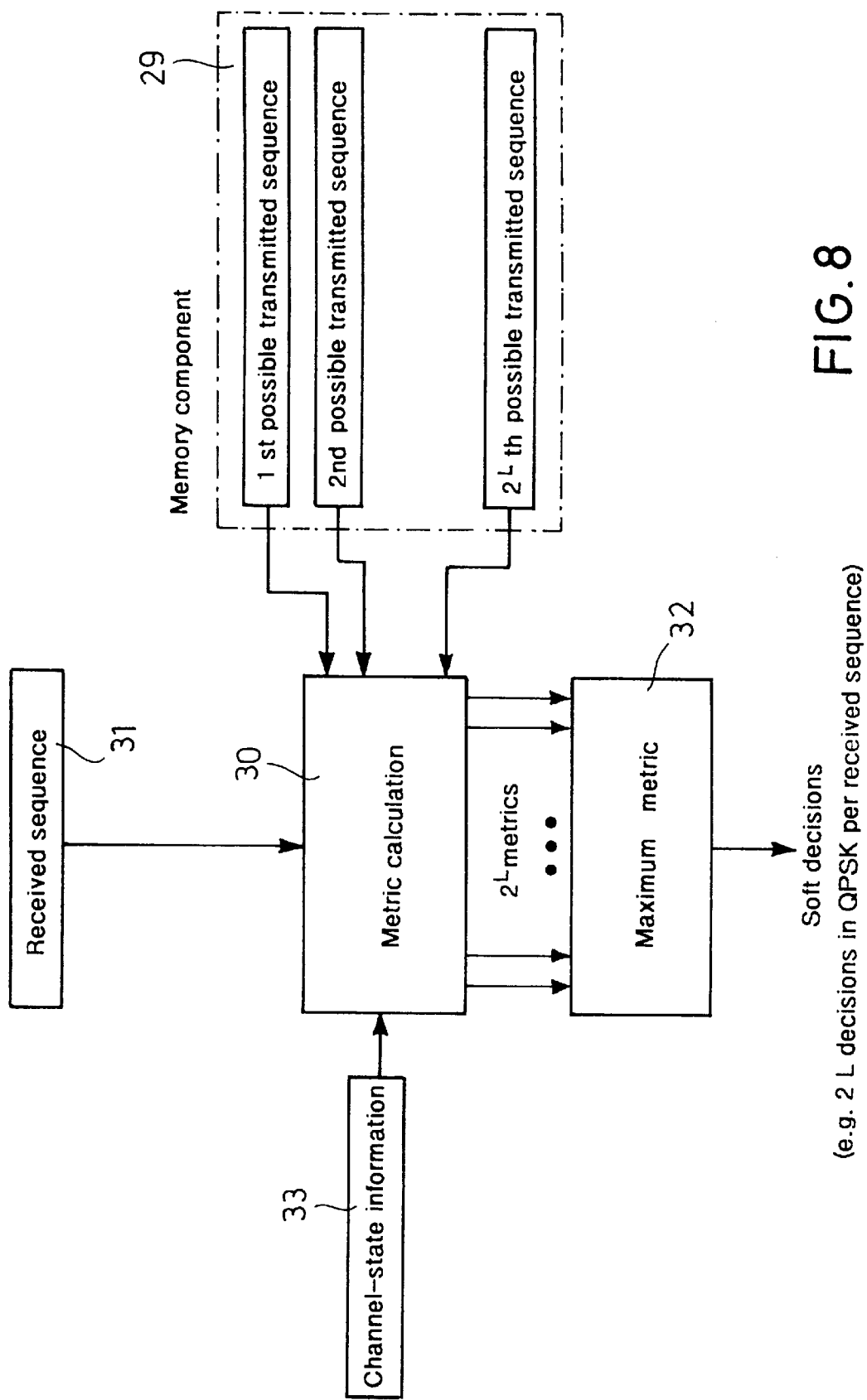
FIG. 8 is a block diagram of the principle of maximum-likelihood sequence estimation, including data-symbol demapping.

FIG. 8 illustrates the principle of maximum-likelihood sequence estimation. Here $2^L$ possible transmitted sequences are stored in a memory component 29 and compared to the respectively received sequence 31 in a circuit 30 for metric calculation. Then the maximum metric is determined in a device 32; from this metric, a conclusion can be reached regarding the most probable of all $2^L$ possible transmitted sequences.

In the maximum-likelihood sequence estimation according to FIG. 8, the channel-state information 33 is required for the metric calculation. Instead of the maximum-likelihood sequence estimator, a conventional detection method can also be used, which employs despreading to detect all of the data symbols of a subscriber station after a equalization, and further transmits soft decisions to the symbol demapper.

The code bits detected and demodulated in the data detector 22 with symbol demappers are unscrambled in a de-interleaver 23, and the information data are detected from them in a channel decoder 24 (Viterbi decoder, SOVA (Soft-Output Viterbi Algorithm) for iterative turbo decoding or block decoder).

If conventional detection methods are used in the method of the invention, they can also be used iteratively to attain a reduction in interference in the superimposed spread sequences.

Figure 9A:
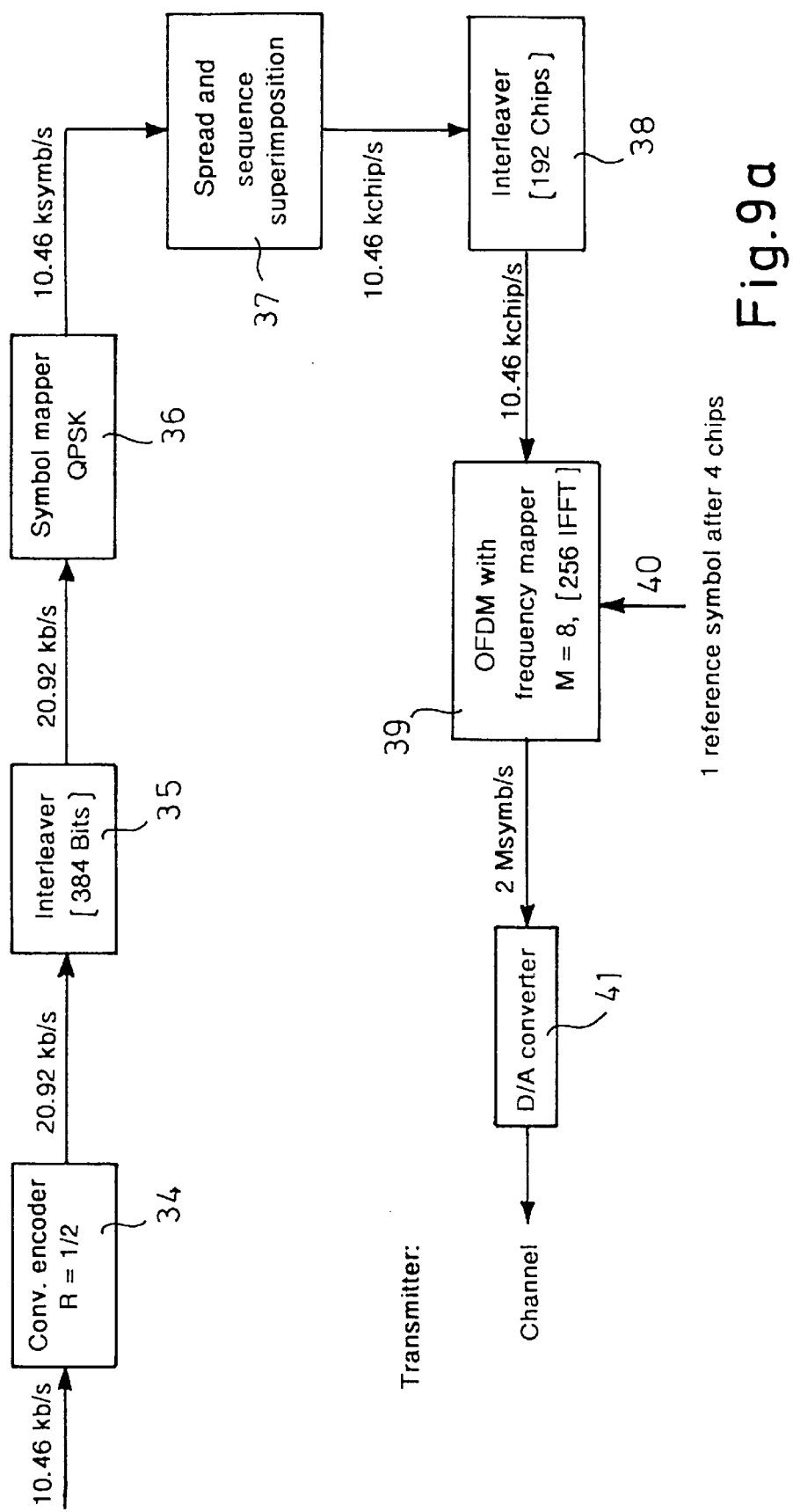
FIG. 9a is a block diagram of the transmission side for an actual, number-specific embodiment and application example of the transmission method of the invention for a TDMA time slot.
Figure 9B:
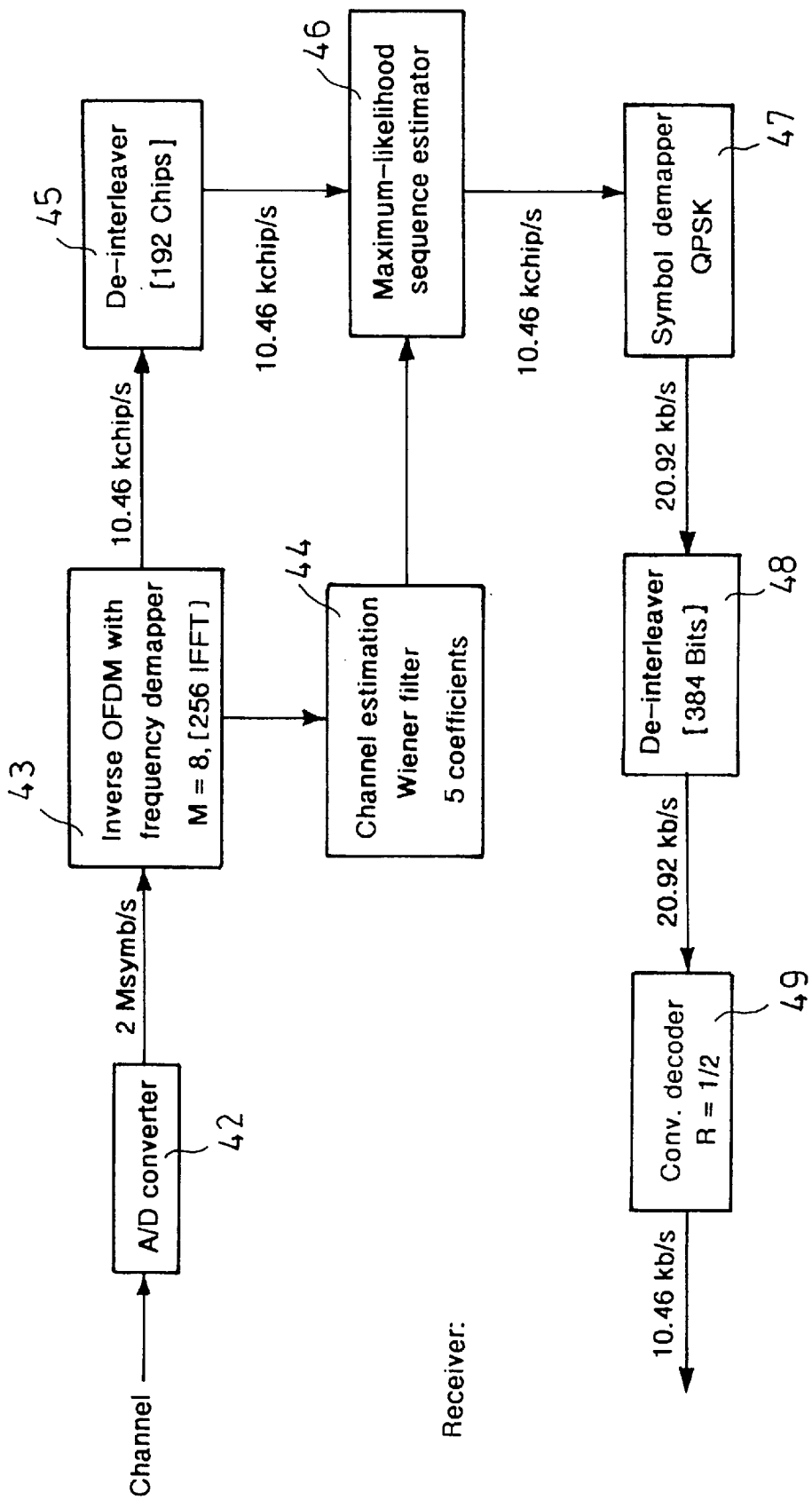
FIG. 9b is a block diagram of the receiving side for an actual, number-specific embodiment and application example of the transmission method of the invention for a DMA time slot.

FIG. 9a and 9b show a block diagram of an embodiment of a system operating with the transmission method of the invention, and additionally with TDMA component. The upper portion of FIG. 9a shows the design of the transmitter and, FIG. 9b the design of the suitable receiver. The entire available transmission bandwidth is 2 MHz, and the carrier-frequency is $f_c$=1.8 GHz.

At a rate of ½, the channel encoder 34 encodes the binary data coming from the voice encoder of a subscriber station at a data rate of 10.46 kbit/s. The channel encoder is a convolutional encoder having a memory length of 6. A pseudo-random interleaver 35 scrambles 348 consecutive code bits, which are QPSK-modulated afterward in a symbol mapper 36. The employed multi-carrier modulation technique OFDM uses 256 sub-carriers with a carrier spacing of 7.81 kHz, and is realised in a 256 point Inverse Fast Fourier Transformation IFFT. The result is an OFDM symbol duration of $T_s$=128 $\mu$s, which is lengthened by a guard interval having the duration $\Delta$=20 $\mu$s.

If each subscriber station uses M=8 sub-carriers, 32 subscriber stations can simultaneously transmit per OFDM symbol, resulting in a net data rate of 41.84 kbit/s per subscriber station, insofar as the 32 subscriber stations transmit continuously on their sub-carriers. Because, however, 9.6 kbit/s are sufficient for a voice transmission, a TDMA component is inserted into the transmission method, with 4 groups of 32 subscriber stations alternatingly transmitting all 31 OFDM symbols.

FIG. 10 illustrates this principle of TDMA for this embodiment. With this additional 'TDMA insertion concept, a total of 128 subscriber stations (users), rather than 32 subscriber stations, can transmit in a bandwidth of 2 MHz at a data rate of 10.46 kbit/s per station.

To keep the complexity of the maximum-likelihood sequence estimator low in the receiver, each QPSK-mapped data symbol is multiplied by a short spread sequence of the chip length L=8 in a spread- and sequence-superimposing device 37. Afterward, eight parallel-modulated spread sequences are superimposed block- and chip-synchronously in the device 37, resulting in a transmission sequence comprising 8 chips.

Following this procedure, 192 chips of 24 consecutive transmission sequences are scrambled pseudorandomly in a interleaver 38, and distributed to M=8 sub-carriers in an OFDM multi-carrier modulator with a frequency mapper 39. The equidistant spacing between the sub-carriers is 250 kHz. For channel estimation in the receiver, a reference symbol is transmitted in the transmitter on each of the eight-sub-carriers initially, and then after every fourth transmitted data symbol; this reference symbol is also known to the receiver. The reference symbols are supplied to the input 40 of the multi-carrier modulator 39.

Thus, a block of 348 code bits is transmitted with 31 OFDM symbols if the transmission on each subcarrier ends with a reference symbol. The data are sent to the radio channel after a digital-analog converter 41.

In the receiver, the signals arriving via the radio channel are first converted into digital form by means of an analog/digital converter 42, and then supplied to an inversely-operating OFDM multi-carrier demodulator 43 having a frequency demapper. There the reference symbols for a channel estimator 44 are also extracted. From the output of the multi-carrier demodulator 43, the data are supplied to a maximumlikelihood sequence estimator 46 by way of a deinterleaver 45 that performs unscrambling.

The data are detected separately in I and Q components with the maximum-likelihood sequence estimator 46, and decoded with a Viterbi decoder. For filtering the channel-state information on each sub-carrier over time, the channel estimator 44 uses a Wiener filter having 5 filter coefficients. The filter coefficients are selected such that they meet the Nyquist criterion twice with respect to temporal changes in the channel at a speed of 200 km/h.

The soft decisions of the maximum-likelihood sequence estimator 46 are conducted further to a QPSK symbol demapper 47. The detected, demodulated code bits are then unscrambled in a de-interleaver 48, and the information data are then detected at the rate ½ in a channel decoder 49 embodied as a convolutional decoder. These procedures are reversed for the transmission side.

With this embodiment, a signal-to-noise ratio of less than 14 dB is required in rural areas, for example, at a speed of 250 km/in to ensure a bit-error probability Of $P_b < 10^{-3}$.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist carries out the recited function, whether or not precisely equivalent to the embodiment or embodiments disclosed in the specification above; and it is intended that such expressions be given their broadest interpretation.

What is claimed is:

1. A method which uses a combination of the multi-carrier modulation method, a plurality of sub-carriers in a frequency band for modulation, and the spread spectrum technique, said method being for simultaneous radio transmission of digital data between a plurality of subscriber stations and a base station, said method comprising:

transmitting reference symbols for channel estimation to be performed on a receiving side, wherein on transmission side the digital data of a subscriber station are spread prior to transmission such that they are modulated with a set of orthogonal spread sequences and superimposed with them;

then transmitting the spread data of a subscriber station, in modulated form, on a partial quantity of sub-carriers in a multi-carrier frequency band, wherein the partial quantities of sub-carriers associated with the individual subscriber stations being disjunct and distributed over an entirety of the frequency band; and inserting the reference symbols, which are known to the receiving side, into a sub-carrier data stream of each respective subscriber station associated therewith, for channel estimation;

multi-carrier demodulating and separating, on the receiving side, the received digital data with regard to the respective subscriber station sub-carrier;

extracting from the information-carrying data the reference symbols, for channel estimation for each sub-carrier to be detected and for deriving channel-state information that is necessary for later data detection and channel decoding for the respective information-carrying data;

detecting together, with a suitable de-spreading detection method, the information-carrying digital data of a subscriber station;

wherein the sub-carriers of a subscriber station are distributed over an entirety of the transmission-frequency band;

wherein spacing between adjacent sub-carriers of a subscriber station is a multiple factor of a reciprocal value of a duration of a multi-carrier modulated data symbol; and wherein the sub-carriers are distinguished for the respective subscriber station at a particular frequency and time.

2. The method according to claim 1, including converting serial/parallel, in blocks on the transmission side, information-carrying, digital data sequences of a subscriber station, which comprises serial, complex data symbols, multiplying data symbols of the block present in parallel form by a spread sequence of the length L (L chips), a maximum of L spread sequences being modulated with data symbols that are symbol- and thus chip-synchronized, and superimposing per block, a maximum of L spread sequences modulated with data symbols are symbol- and thus chip-synchronously, resulting in a transmission sequence comprising L chips, which contains the information of a maximum of L data symbols.

3. The method according to claim 1, wherein on the transmission side, a channel encoder first provides the digital data with an error-protection channel code against channel disturbances.

4. The method according to claim 3, wherein the channel code includes at least one of convolution codes, turbo codes or block codes.

5. The method according to claim 3, including scrambling of code bits obtained from the channel encoder with an interleaver.

6. The method according to claim 5, wherein the scrambling is carried out in blocks.

7. The method according to claim 5, including mapping and digitally modulating the scrambled code bits into complex data symbols in a symbol mapper.

8. The method according to claim 7, including performing a digital modulation in the symbol mapper by phase shift keying including at least one of Binary Phase Shift Keying (BPSK) modulation or a Quadrature Phase Shift Keying (QPSK) modulation, wherein the complex data symbols are present in a respective modulated form at an output of the symbol mapper.

9. The method according to claim 2, including use of orthogonal Walsh-Hadamard sequences, of which L orthogonal spread sequences of a length L (L chips) exist, as spread sequences.

10. The method according to claim 2, including superimposing less than L spread sequences having a length L, the spread sequences having been modulated with data symbols.

11. The method according to claim 2, including scrambling the chips of a plurality of transmission sequences in frequency and time direction, with a frequency and time interleaver using a plurality of multi-carrier-modulated data symbols.

12. The method according to claim 11, wherein the scrambling is carried out in blocks.

13. The method according to claim 2, including:
spreading and sequence superimposing or scrambling in the frequency and time interleaving; wherein
a number M of sub-carriers of a subscriber station may not be a multiple of the spread-code length L.

14. The method according to claim 13, wherein the sub-carriers of a subscriber station are distributed over an entirety of the transmission-frequency band.

15. The method according to claim 14, wherein spacing between adjacent sub-carriers of a subscriber station is equidistant.

16. The method according to claim 14, wherein spacing between adjacent sub-carriers of a subscriber station is pseudo-random.

17. The method according to claim 1, including use of Orthogonal Frequency-Division Method (OFDM) for transmission-side multi-carrier modulation.

18. The method according to claim 17, wherein the orthogonal frequency-division method is realized with an Inverse Fast Fourier Transformation (IFFT) and a Fast Fourier Transformation (FFT).

19. The method according to claim 2, wherein the multi-carrier-modulated data symbols are extended by a cyclic prefix on the tramission side, the cyclic prefix being a copy of last samples of the multi-carrier modulated signal.

20. The method according to claim 2, including: multi-carrier-demodulating and frequency-demapping the data symbols on the receiving side, specifically to the subscriber station following an analog/digital conversion of the received data streams and an elimination of the possibly-present guard interval;
extracting the reference symbols necessary for the channel estimation from the information-carrying data; and
then parallel/serial converting the information carrying data.

21. The method according to claim 20, including filtering the received reference symbols in the channel estimation for each sub-carrier to be detected over time, and determining therefrom the channel-state information necessary for data detection and channel decoding for the information-carrying data.

22. The method according to claim 20, wherein, when the sub-carriers associated with one of the subscriber stations are not distributed over an entirety of the transmission-frequency bandwidth on the transmission side, and when at least one group of adjacent sub-carriers is formed in a transmission-frequency band, then, during the channel estimation in the receiver, the receiver reference symbols for each sub-carrier to be detected are frequency-domain filtered in a frequency direction within the multi-carrier symbol over the subcarriers and in a time direction over several multi-carrier symbols and the channel-state information required for data detection and channel decoding is determined therefrom for the information-carrying data.

23. The method according to claim 21, including use of a Wiener filter for filtering in the channel estimation.

24. The method according to claim 20, including providing corresponding scrambling on the transmission side and including at least one of detection in the receiver of the received information-carrying data following multi-carrier demodulation and subscriber station-specific frequency demapping after unscrambling in a frequency and time de-interleaver.

25. The method according to claim 24, including using a maximum-likelihood sequence estimation, the maximum-likelihood sequence estimation determining most probable sequences of all possible transmitted sequences and providing the associated data as soft decisions, for data detection.

26. The method according to claim 25, wherein the maximum-likelihood sequence estimation is performed separately in the I and Q signal components in a presence of QPSK-modulated data symbols.

27. The method according to claim 24, including use, for data detection, of a conventional detection method detecting all data symbols of a subscriber station after a equalization by means of a de-spreading, and providing of a soft decisions.

28. The method according to claim 27, including iterative use of the conventional data-detection method to attain a reduction in interference in the superimposed spread sequences.

29. The method according to one of claim 24, including deriving in the receiver the digital, information-carrying data from the detected data symbols of a subscriber station after at least one of a data-symbol mapping, a code-bit unscrambling in a de-interleaver, or a channel decoding, if corresponding measures are provided on the transmission side.

30. The method according to claim 1, including
selecting system parameters to provide substantially more data per transmission channel than is necessary for pure voice transmission (9.6 kbit/s), and
accommodating a plurality of voice channels in a transmission channel per transmission channel the via a Time-Division Multiple-Access (TDMA) method.

31. The method according to claim 1, including flexibly allocating the number of sub-carriers to a mobile subscriber station depending on an available capacity thereof, regardless of the selected spread-code length.

32. The method according to claim 1, including using said method for both the uplink from the subscriber station to the base station and the downlink from the base station to the subscriber station.

33. The method according to claim 1, including using said method in a field of mobile radio.

34. The method according to claim 33, wherein said field of mobile radio includes cellular mobile radio.

35. The method according to claim 1, including using said method in a field of cordless telephone (CT).

36. The method according to claim 5, wherein the scrambling is carried out pseudo-randomly.

37. The method according to claim 5, wherein the scrambling is carried out pseudo-randomly.

* * * * *